(12) United States Patent
Trukenmueller

(10) Patent No.: US 10,823,632 B2
(45) Date of Patent: Nov. 3, 2020

(54) METHOD FOR MEASURING THE UNBALANCE OF FLEXIBLE ROTORS BY MEANS OF POSITION-MEASURING SENSORS

(71) Applicant: Schenck RoTec GmbH, Darmstadt (DE)

(72) Inventor: Kai Trukenmueller, Darmstadt (DE)

(73) Assignee: Schenck RoTec GmbH, Darmstadt (DE)

( * ) Notice: Subject to any disclaimer, the term of this patent is extended or adjusted under 35 U.S.C. 154(b) by 44 days.

(21) Appl. No.: 16/259,182

(22) Filed: Jan. 28, 2019

(65) Prior Publication Data
US 2019/0242774 A1  Aug. 8, 2019

(30) Foreign Application Priority Data
Feb. 7, 2018  (DE) .......................... 10 2018 102 751

(51) Int. Cl.
| | |
|---|---|
| *G01M 1/22* | (2006.01) |
| *G01M 1/24* | (2006.01) |
| *F16F 15/32* | (2006.01) |
| *G01H 1/00* | (2006.01) |

(52) U.S. Cl.
CPC ............. *G01M 1/22* (2013.01); *F16F 15/322* (2013.01); *G01H 1/003* (2013.01); *G01M 1/24* (2013.01)

(58) Field of Classification Search
CPC ............. G01M 1/16; G01M 1/22; G01M 1/24
See application file for complete search history.

(56) References Cited

U.S. PATENT DOCUMENTS

| | | | | |
|---|---|---|---|---|
| 3,096,639 | A | * 7/1963 | Theilheimer | G01M 1/22 73/865.8 |
| 3,122,020 | A | * 2/1964 | Hack | G01M 1/22 73/462 |
| 4,135,244 | A | 1/1979 | Davis | |
| 4,170,896 | A | * 10/1979 | Korkosz | G01M 1/32 73/462 |
| 4,423,635 | A | 1/1984 | Senicourt et al. | |

(Continued)

FOREIGN PATENT DOCUMENTS

| | | |
|---|---|---|
| DE | 40 19 721 A1 | 1/1991 |
| DE | 41 33 787 A1 | 4/1993 |

OTHER PUBLICATIONS

W. Kellenberger, "Elastisches Wuchten" (Elastic Balancing), Springer-Verlag, Berlin 1987, pp. 317-325, with English summary.

*Primary Examiner* — Natalie Huls
(74) *Attorney, Agent, or Firm* — Collard & Roe, P.C.

(57) ABSTRACT

In a method for identifying an unbalance correction for flexible rotors (1), the rotor (1) is rotatably mounted in two bearing devices. An RPM sensor (4) records the speed of the rotor (1) and a radial movement of the rotor (1) is recorded, by means of position sensors (3) at measuring points (6), during an unbalance measurement run or a plurality of unbalance measurement runs for different rotor speeds. The measured values recorded are fed to an evaluation device (5), which determines the eccentricity measured values assigned to the measuring points (6) by means of expanding the influence coefficient method, and therefore unbalances are determined per plane and eccentricities are determined per measuring point for each measurement run.

6 Claims, 1 Drawing Sheet

(56) References Cited

U.S. PATENT DOCUMENTS

| | | | | |
|---|---|---|---|---|
| 5,140,534 A | * | 8/1992 | Miller | G01M 1/16 |
| | | | | 33/203.15 |
| 5,214,585 A | | 5/1993 | Enrich | |
| 2004/0015326 A1 | * | 1/2004 | Bluestein | G01M 1/22 |
| | | | | 702/155 |
| 2004/0168291 A1 | * | 9/2004 | Robbins | G01M 1/34 |
| | | | | 29/406 |
| 2007/0095231 A1 | | 5/2007 | Van Denend | |
| 2007/0277606 A1 | * | 12/2007 | Robbins | G01M 1/34 |
| | | | | 73/459 |
| 2010/0000320 A1 | * | 1/2010 | Shao | G01M 1/24 |
| | | | | 73/487 |
| 2014/0238128 A1 | * | 8/2014 | Vosejpka | G01M 1/16 |
| | | | | 73/460 |
| 2016/0349137 A1 | * | 12/2016 | Guo | H02K 15/165 |
| 2018/0073953 A1 | * | 3/2018 | Guo | F16F 15/28 |
| 2018/0252608 A1 | * | 9/2018 | Rogers | G01M 1/16 |

* cited by examiner

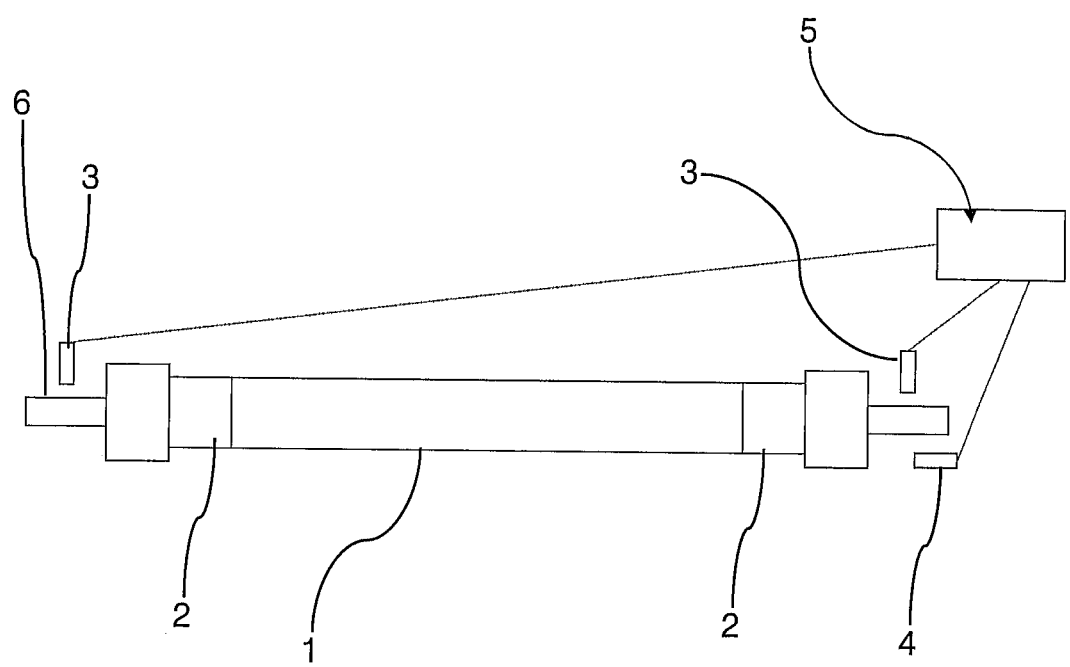

METHOD FOR MEASURING THE UNBALANCE OF FLEXIBLE ROTORS BY MEANS OF POSITION-MEASURING SENSORS

CROSS REFERENCE TO RELATED APPLICATIOMS

Applicants claim priority under 35 U.S.C. § 119 of German Patent Application No. 10 2018 102 751.6 filed Feb. 7, 2018.

FIELD OF THE INVENTION

The invention relates to a method for measuring the unbalance of flexible rotors by means of position-measuring sensors at measuring points that have an unknown eccentricity with respect to the bearing surface of the rotor.

BACKGROUND OF THE INVENTION

In order to balance rigid rotors, it is generally sufficient to position correction unbalances in two axially separate planes. The correction unbalances and therefore also the unbalanced state of the rotor is not dependent on the operating speed. The balancing speed can be freely selected. It is often selected to be as low as possible and is often lower than during subsequent operation. In contrast, for flexible rotors, the term "unbalance" has to be generalised. The number of planes required can be more than two. In addition, the axial position of the planes is of greater importance. Whether a rotor can be considered to be rigid or flexible depends on both the mechanical properties of the rotor and on the operating speed. As the operating speed increases, resilient properties play an increasingly important role.

DE 41 33 787 A1 discloses a balancing method for resilient rotors, which determines the balancing masses required for balancing the rigid body unbalance and the flexible deflections of the rotor without the need for test weight runs. In an unbalance measurement run at a speed at which the rotor displays rigid body behaviour, at least one unbalance measured value is first determined. At least one other unbalance measured value is detected per bearing plane and the eigenmode to be corrected is determined at a speed that is within the range of the eigenmode speed that has to be taken into account. In an evaluation device, using the unbalance measured values obtained and rotor- or bearing-specific characteristics, the unbalance correction is calculated to compensate for the rigid body unbalance and the eigenmode proportion that must be taken into account, wherein a constant speed-independent force fingerprint is calculated for each bearing plane and describes the effect of the unbalance of the resilient rotor behaviour. This method requires rotor- and bearing-specific characteristics to be entered into the arithmetic unit, such as the dimensions and shape of the rotor to be balanced and the material used therefor.

DE 40 19 721 A1 describes a balancing method for a resilient rotor, which is operated near to or at critical speeds, which method comprises balancing the rotor in three or more balancing planes and using combinations of general unbalance distributions of the rotor and predetermined eigenmodes, without actually balancing the rotor at critical speeds. In an unbalance measurement run that has slow running speeds, corrections that are made in two balancing planes of the rotor are usually determined. In addition, a third correction is made on the rotor, which is proportional to the first and second correction and to the unbalance/mode-shape combination. Following another unbalance test run that has slow running speeds and is used as the test weight run with regard to the third correction, corrections are then determined once again for the first and second balance planes and are carried out to finally balance the rotor. Using this balancing method, it is not possible to minimize the maximum permissible correction weights or the permissible residual unbalance values.

The unbalance is often measured indirectly by means of the housing vibration. This means that the vibrations that are transmitted from the shaft to the fixed structure of the housing via the bearing are measured. In this case, the housing vibrations are usually measured by means of accelerometer (for example piezo vibration sensors) or vibration velocity sensors. In particular, for high-speed balancing systems or for balancing of plant rotors such as turbines or generators for operational purposes, position-measuring sensors are additionally or alternatively also used, which, instead of measuring the housing vibrations, directly measure the radial movement of the shaft. Examples of position-measuring sensors are capacitive or inductive sensors (eddy current sensors) or laser triangulation sensors. In soft bearings such as foil or air bearings, the bearing gap is large with respect to the centre of mass eccentricity of the unbalanced rotor. The rotor rotates about its axis of inertia, which extends eccentrically inside the bearings. The forces transmitted to the surrounding structure (for example the housing) by means of the soft bearings are relatively small. As a result, although it is possible to measure the eccentrically extending axis of rotation by means of position sensors, the vibrations transmitted to the structure are too small for accurate unbalance determination by measuring the housing vibrations. The effect is even greater if the housing is relatively heavy in comparison with the rotor. This is the case in particular for units that have small rotors and a relatively large housing (for example having inflow and outflow piping or stator windings for an electric drive or generator).

The influence coefficient method is a calculation method for determining the unbalance, which method is based on measurement runs having a known unbalance (for example textbook by W. Kellenberger; "elastic balancing", Berlin 1987, pages 317-325). This method is primarily used for measuring unbalances inflexible rotors. It is assumed here that a linear relationship exists between the applied unbalances and the vibration responses at the measuring points. The test unbalance per plane is noted as a complex number, wherein the size and angle of the complex number corresponds to the size of the unbalance and the angular position on the rotor in each case. For each test run, it's possible for the vibrations to be measured at a plurality of positions and speeds. The measurement can also be carried out during start-up of the rotor and subsequently assigned to fixed speeds or speed intervals. The type of measurement (for example acceleration at the bearing points or measurement of the radial shaft position using sensors) is not relevant for formulating the influence coefficient method. The first order is evaluated from the time series of the sensor values on the basis of the current rotation frequency. For this purpose, a speed or angle sensor is required that measures a mark on the rotor. A complex number is likewise formed from the signal amplitude and phase of the vibration sensors with respect to the speed sensor. The relationship between the unbalance and the vibration signal can then be described on the basis of a system of linear equations using complex numbers:

$$s = Ku$$

In this case, s is the vector of the complex signal amplitudes. It contains the values from all the sensors and speeds used. It accordingly has the length N=(number of speed sampling points)×(number of sensors). In the vector of the unbalances u, the unbalances per unbalance plane are consolidated. For P unbalance planes, u has the length P. The influence coefficient matrix K has the dimension N×P. In this case, s, K and u are complex quantities.

The influence coefficient method can be solved by determining the matrix K, for example. This is generally determined by P+1 test runs, wherein, for each run, a known individual unbalance is applied in a different unbalance plane. In addition, a run can be performed without a test weight, and is known as the original run. By subtracting the original run from all the other test runs, the influence coefficient matrix K is then determined. This is, however, only a possible method for determining K.

If K is known, the unbalanced state in all planes can be calculated for any given run of the rotor. This is calculated by solving the system of linear equations according to the unknown vector of the unbalances u. There are generally more measuring points N than unknown unbalances P such that the system of equations is overdetermined. In this case, it can be solved with the aid of the linear curve fitting (method of least squares).

However, there are other methods that solve the system with the aid of optimisation methods and additional boundary conditions where necessary. If the system is solved, the unbalance u in each plane is usually balanced, for example by attaching counter unbalances or removing material. The vibration can then be measured again and the rotor can be balanced in further steps if necessary.

If position sensors are used in the influence coefficient method, the aim is to reduce the shaft deflection that is caused by the unbalances. This is difficult if the measuring point on the rotor at which the deflection is measured, already has an eccentricity without rotation, for example by means of a bent shaft or as a result of a strike to the measuring surface. If the eccentricity error is ignored and the influence coefficient method is used in accordance with the known method, large errors can be generated, In this case, the constant measuring error is interpreted as the vibration displacement of the shaft, which is intended to be compensated for by the balancing process.

SUMMARY OF THE INVENTION

The invention therefore addresses the problem of providing a method for measuring unbalances, which takes into account the eccentricity at at least one measuring point.

The object is achieved by a method for determining an unbalance of flexible rotors by means of position-measuring sensors at measuring points that have an unknown eccentricity with respect to the bearing surfaces, in which the rotor is rotatably mounted in bearings, in which a speed sensor records the speed of the rotor, in which a radial movement of the rotor is recorded, by means of position-measuring sensors at measuring points, during an unbalance measurement run or a plurality of unbalance measurement runs for different rotor speeds, in which the measured values recorded are fed to an evaluation device, wherein the evaluation device uses the measured values recorded to solve a system of equations that comprises the unknown eccentricity as the unknown in addition to the unbalance, and therefore the unbalance per plane is calculated and the eccentricity per measuring point is calculated. By means of the method according to the invention, the eccentricity of the measuring point can be recorded during the actual unbalance measurement run and can be taken into account when calculating the unbalance. This means that a separate measurement run is not required to determine possible eccentricity at low speed.

The unbalance measured values assigned to the measuring points can be determined, for example, by expanding the influence coefficient method. However, other optimisation methods can also be used. If the measuring points have unknown eccentricities, these are contained in the complex signal amplitudes as errors. The system of equations of the influence coefficient method can advantageously be expanded by $$s = Ku + Ee$$

In this case, e is the vector for the unknown eccentricities. The length of the vector equals the number of measuring points. The matrix E only consists of zeros and ones. There is only one "one" in each column. This "one" is in column number k, which coincides with the measuring point on these lines:

$$E_{ik} = \begin{cases} 1, \\ 0, \end{cases}$$

1 being when $S_i$ signal of sensor in position, otherwise 0.

The expansion of the influence coefficient method can be formulated as $$s = A^x$$

In this case, both matrices K and E can be written next to one another in A as $$A = [K\ E].$$

The vector x can comprise the unknown unbalances and eccentricities.

$$x = \begin{pmatrix} u \\ e \end{pmatrix}$$

In this case, the influence coefficient matrix K can be determined in accordance with the known influence coefficient method. Since there are always differences in this case, the basic eccentricity does not have an influence. In order to calculate the unbalance for any of the measurement runs, in one embodiment the expanded influence coefficient method can be used.

It is preferable for the unbalance to be measured in a speed range in which the rotor displays resilient deflections. For low-speed balances, it is not always possible to let the rotor rotate about the axis in which the components lie during the subsequent assembly of the rotor. This can be disadvantageous during the subsequent operation of the rotor, since even minor eccentricity errors are sufficient to achieve unbalances of a noteworthy size on the assembled rotor. In a preferred embodiment, the balancing procedure is carried out in a speed range in which the rotor already behaves flexibly. As a result, the normal operation of a fast-moving rotor system can be recreated and the rotor can be balanced at speeds of up to the operating speed.

In order to measure the unbalance, it may be preferable for the rotor to be accelerated to preset measurement speeds.

As a result, the effects of a rotor unbalance and, for example, a test unbalance can be accurately determined at a desired speed.

It may be advantageous for the measurements to be made during start-up or run-down of the rotor such that additional test cycles are not required and the rotor can be balanced efficiently.

It may also be preferable for the unbalance and the eccentricity to be determined in the operating speed range of the rotor. In this case, the rotor is accelerated to a speed that is advantageously its operating speed or at least lies in its operating speed range. For flexible rotors in particular, the rotor cannot be satisfactorily balanced at low speeds. In contrast, in the preferred embodiment of the method, the rotor is accelerated to speeds in its operating speed range such that the unbalance is measured in a speed range that reflects the real operation of the rotor and allows for reliable balancing.

In a preferred embodiment, the rotor is mounted in soft bearings. Stiff bearings are often used to transmit resultant unbalance vibrations to the housing, where they are measured. For certain rotor systems, it is, however, advantageous or even necessary to use soft bearings. By means of the preferred embodiment of the method, in which the rotor is mounted in soft bearings and the measurement is carried out by means of position sensors, the former measurement methods can be considerably improved and the eccentricity can be detected in addition to the unbalance.

It may be advantageous for vibrations to be measured at additional measuring points by means of a sensor. Should vibrations be transmitted, vibration sensors can be used in addition to position sensors, the measured values from which can be used for solving the system of equations.

BRIEF DESCRIPTION OF THE DRAWING

An embodiment of the present invention is illustrated in the accompanying drawing and will be described in greater detail in the following. In the drawing, FIG. 1 shows a rotor in an unbalance measuring apparatus.

DETAILED DESCRIPTION OF THE DRAWINGS

FIG. 1 is a schematic view of an unbalance measuring apparatus, in which a driven rotor 1 comprises bearing surfaces 2 and is mounted in two bearings, for example. The rotor 1 can also be mounted in more than two bearings. The bearings can be soft bearings, such as foil or air bearings. Two position sensors 3 record radial movements of the rotor 1, i.e. the deflection thereof. A speed and angle sensor 4 records a mark on the rotor 1. The measured values recorded by the sensors 3 and 4 are fed to an evaluation device 5.

Position sensors 3 are used that determine the eccentricity of at least one measuring point 6 or measuring surface having an unknown eccentricity with respect to the bearing surfaces 2. Owing to the soft bearings, no noteworthy vibrations occur that could be used to calculate the unbalance. If needed, additional sensors can be used that measure a housing vibration or a foundation vibration, for example, which can then in turn be used to calculate the unbalance.

The method in question can advantageously be used when the eccentricity measurement cannot be carried out at the bearing points due to the bearings being closed or inaccessible. It is also possible to measure right next to the bearings at a point that only has low eccentricity with respect to the bearing. This is, however, only possible if the bearing points are accessible to position sensors 3. The rotor 1 is, however, usually as compact as possible. As a result, for small units in particular, no sensors can be positioned at the bearing points for space reasons. By means of the preferred method and by positioning the position sensors 3 at measuring points having an unknown radial eccentricity with respect to the bearing surfaces 2, it is, however, easy to measure the unbalance of compact rotor systems.

A drive for the unbalance measuring apparatus accelerates the rotor 1 to corresponding speeds, wherein the drive can also be controlled such that fixed balancing speeds can be preset. The measured values to be recorded can also be recorded during normal operation so that, for example during start-up of the rotor 1, the respective measured values are recorded at preset balancing speeds and fed to the evaluation device 5. The rotor 1 can also be accelerated to speeds that lie within its operating speed range.

By means of the method, rotors 1 having any number of balancing planes can be balanced. Often the provision of balancing planes is dependent on the design, such as in turbochargers or turbine rotors, and said planes only allow for a maximum permissible balancing mass for space or strength reasons.

The rotor 1 is accelerated to a preset speed n, in which it displays flexible behaviour. When the preset speed n is reached, measured values are recorded at the sensors 3, 4 and are fed to the evaluation device 5. The measurement can also be carried out at a plurality of speeds n.

If the eccentricity error of the measuring points 6 with respect to the bearing surfaces 2 is known, it can be taken into account in the measuring signals by way of calculation and the known influence coefficient method can be used to calculate the unbalance, for example. It is, however, not always possible to measure the eccentricity. During assembly, the bearings are usually no longer accessible. During measurement prior to assembly, it cannot be ensured that the eccentricity errors still remain during mounting. Often the eccentricity of the measuring surface 6 is detected at low speeds and the measured values are subtracted from the high-speed measurements (the so-called "runout compensation"). However, this actually only works effectively in stiff bearings, such as roller bearings. For hydrodynamic plain bearings, there are often different axes of rotation ("orbits") for different speeds so that an eccentricity error cannot be clearly defined. Other bearings, such as foil bearings, require a minimum speed so that they can run stably. In this case, it is often not possible to allow the rotor to rotate slowly. It is accelerated very quickly to a minimum speed that is above the rigid body natural frequencies of the rotor-bearing system. By means of the method according to the invention, it is easy to measure the unbalance by taking into account the eccentricity of such rotor systems. An unbalance of flexible rotors 1 can be determined by means of position-measuring sensors 3 at measuring points 6 that have an unknown eccentricity with respect to the bearing surfaces 2, wherein the rotor 1 is rotatably mounted in bearings, wherein the speed sensor 4 records the speed of the rotor 1, wherein a radial movement of the rotor 1 is recorded, by means of position-measuring sensors 3 at measuring points 6, during an unbalance measurement run or during a plurality of unbalance measurement runs for different rotor speeds, and the measured values recorded are fed to an evaluation device 5, wherein the evaluation device 5 uses the measured values recorded to solve an expansion of the influence coefficient method according to the balancing system $s=A^x$, with the vector s which comprises measurement values and speeds, with A=[K E], with the influence coefficient matrix K with the dimension N X P and the matrix $$E_{ik} = \begin{cases} 1, \\ 0, \end{cases}$$

1 being when $S_i$ signal of sensor in position, otherwise 0, with the vector x comprising the unknown unbalances and eccentricities with $$x = \begin{pmatrix} u \\ e \end{pmatrix},$$

so that, for each measurement run, unbalances are detected per plane and eccentricities are detected per measuring point. A key concept of the method is that, in addition to the unbalance to be determined, the eccentricity is contained in the system of equations as the unknown, wherein the system of equations can be solved by optimisation methods. The use of an expanded influence coefficient method is merely a preferred embodiment.

The method has proven particularly advantageous for fast-moving rotor systems in small units, such as electric compressors, vacuum motors, pumps or micro gas turbines. Often in these systems the rotor is mounted in soft bearings, such as air bearings, gas bearings, foil bearings or magnetic bearings. By means of the method according to the invention, the unbalance can be measured and the eccentricity can be determined, wherein position sensors advantageously measure the deflection of the rotor shaft outside the bearing points.

What is claimed is:

1. A method for determining an unbalance of flexible rotors by means of position-measuring sensors at measuring points that have an unknown eccentricity with respect to the bearing surfaces comprising the following steps:
   rotatably mounting the rotor in bearings;
   recording the speed of the rotor using a speed sensor;
   recording a radial movement of the rotor by means of position-measuring sensors at measuring points, during an unbalance measurement run or a plurality of unbalance measurement runs for different rotor speeds; and
   feeding the measured values recorded to an evaluation device;
   wherein the evaluation device uses the measured values recorded to solve a system of equations, which comprises the unknown eccentricity as the unknown in addition to the unbalance, and therefore the unbalance is calculated per plane and the eccentricity is calculated per measuring point, and
   wherein the measurement is carried out in a speed range in which the rotor displays resilient deflections.

2. The method as per claim 1, wherein the rotor is accelerated to preset measurement speeds.

3. The method as per claim 1, wherein the measurements are taken during start-up or run-down of the rotor.

4. The method as per claim 1, wherein the rotor is mounted in soft bearings.

5. The method as per claim 1, wherein vibrations are measured at additional measuring points by means of a sensor.

6. A method for determining an unbalance of flexible rotors by means of position-measuring sensors at measuring points that have an unknown eccentricity with respect to the bearing surfaces comprising the following steps:
   rotatably mounting the rotor in bearings;
   recording the speed of the rotor using a speed sensor;
   recording a radial movement of the rotor by means of position-measuring sensors at measuring points, during an unbalance measurement run or a plurality of unbalance measurement runs for different rotor speeds; and
   feeding the measured values recorded to an evaluation device;
   wherein the evaluation device uses the measured values recorded to solve a system of equations, which comprises the unknown eccentricity as the unknown in addition to the unbalance, and therefore the unbalance is calculated per plane and the eccentricity is calculated per measuring point, and
   wherein the unbalance and the eccentricity are determined in the operating speed range of the rotor.

* * * * *